US008326844B2

(12) United States Patent
Yamada et al.

(10) Patent No.: US 8,326,844 B2
(45) Date of Patent: Dec. 4, 2012

(54) IMAGE PROCESSING APPARATUS HAVING GROUP STORAGE AREAS FOR STORING FILES FOR OPERATOR GROUPS

(75) Inventors: Masami Yamada, Sennan-gun (JP); Yoshiki Tokimoto, Nishiwaki (JP); Kimie Mishima, Itami (JP); Yoshiyuki Tamai, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1149 days.

(21) Appl. No.: 11/011,096

(22) Filed: Dec. 15, 2004

(65) Prior Publication Data
US 2006/0053167 A1 Mar. 9, 2006

(30) Foreign Application Priority Data
Sep. 8, 2004 (JP) .................................. 2004-260898

(51) Int. Cl.
G06F 7/00 (2006.01)
(52) U.S. Cl. ...................................................... 707/751
(58) Field of Classification Search .................. 707/751
See application file for complete search history.

(56) References Cited

U.S. PATENT DOCUMENTS

| 5,517,316 | A | * | 5/1996 | Hube | 358/296 |
| 5,708,766 | A | | 1/1998 | Goto | |
| 6,134,017 | A | | 10/2000 | Schlank et al. | |
| 6,151,464 | A | * | 11/2000 | Nakamura et al. | 399/79 |
| 6,384,923 | B1 | * | 5/2002 | Lahey | 358/1.13 |
| 6,498,837 | B1 | * | 12/2002 | Baba | 379/100.08 |
| 6,698,950 | B2 | * | 3/2004 | Nishii | 400/63 |
| 6,704,118 | B1 | | 3/2004 | Hull et al. | |
| 6,745,334 | B1 | | 6/2004 | Ikegami | |
| 6,791,707 | B2 | * | 9/2004 | Laverty et al. | 358/1.15 |
| 6,880,051 | B2 | * | 4/2005 | Timpanaro-Perrotta | 711/162 |
| 6,883,980 | B2 | * | 4/2005 | Guddanti | 400/61 |
| 6,978,096 | B2 | * | 12/2005 | Maeshima | 399/82 |
| 7,072,053 | B2 | * | 7/2006 | Guddanti | 358/1.13 |
| 7,072,066 | B2 | * | 7/2006 | Guddanti | 358/1.15 |
| 7,139,102 | B2 | * | 11/2006 | Minato | 358/3.07 |

(Continued)

FOREIGN PATENT DOCUMENTS
JP 11-103367 4/1999
(Continued)

OTHER PUBLICATIONS

Notification of Reasons of Refusal issued in corresponding Japanese Patent Application No. 2004-260898, and translation thereof.

*Primary Examiner* — Hung Q Pham
*Assistant Examiner* — Hubert Cheung
(74) *Attorney, Agent, or Firm* — Buchanan Ingersoll & Rooney PC

(57) ABSTRACT

An image processing apparatus has a storage device provided for a plurality of operators for storing files and run history on the files for each of the plurality of operators. Operators among the plurality of operators can be related. A display device displays information on files which were dealt with by a group including an operator and other operators related to the operator among the plurality of operators when the operator instructs to display the information on files. In a modified example, the information on files is displayed when the operator accesses said storage device.

24 Claims, 15 Drawing Sheets

U.S. PATENT DOCUMENTS

| | | | |
|---|---|---|---|
| 7,221,885 B2 * | 5/2007 | Sato | 399/81 |
| 7,362,458 B2 * | 4/2008 | Adachi | 358/1.15 |
| 7,369,750 B2 * | 5/2008 | Cheng et al. | 386/83 |
| 7,577,706 B2 * | 8/2009 | Arregui et al. | 709/206 |
| 8,090,771 B2 * | 1/2012 | Kimoto et al. | 709/203 |
| 2001/0015817 A1 * | 8/2001 | Adachi | 358/1.13 |
| 2001/0053301 A1 * | 12/2001 | Nishii | 400/63 |
| 2002/0027675 A1 * | 3/2002 | Minato | 358/1.15 |
| 2003/0055823 A1 * | 3/2003 | Shibanuma | 707/7 |
| 2003/0084044 A1 * | 5/2003 | Simpson et al. | 707/6 |
| 2003/0177324 A1 * | 9/2003 | Timpanaro-Perrotta | 711/162 |
| 2003/0185613 A1 * | 10/2003 | Guddanti | 400/61 |
| 2003/0204848 A1 * | 10/2003 | Cheng et al. | 725/58 |
| 2004/0093392 A1 * | 5/2004 | Nagamatsu et al. | 709/218 |
| 2004/0095599 A1 * | 5/2004 | Guddanti | 358/1.15 |
| 2004/0105111 A1 * | 6/2004 | Guddanti | 358/1.13 |
| 2004/0117490 A1 * | 6/2004 | Peterka et al. | 709/229 |
| 2004/0194034 A1 * | 9/2004 | Vlamis | 715/530 |
| 2005/0105146 A1 * | 5/2005 | Tanaka | 358/498 |
| 2005/0111866 A1 * | 5/2005 | Sato | 399/79 |
| 2005/0114760 A1 * | 5/2005 | Arregui et al. | 715/513 |
| 2006/0010128 A1 * | 1/2006 | Suzuki | 707/5 |
| 2007/0204045 A1 * | 8/2007 | Shima | 709/226 |
| 2008/0196065 A1 * | 8/2008 | Cheng et al. | 725/58 |

FOREIGN PATENT DOCUMENTS

| | | | |
|---|---|---|---|
| JP | 2000-006475 | | 1/2000 |
| JP | 2000-231562 | * | 8/2000 |
| JP | 2004-104411 | | 4/2004 |
| JP | 2004-145707 | * | 5/2004 |

* cited by examiner

*Fig. 12*

PRINT HISTORY RETRIEVED FROM JOB NUMBER

| FILE | OPERATOR B | OTHERWISE | CREATION DATE |
|---|---|---|---|
| FILE-A1 | | | 06151045 |
| FILE-A2 | | 07151057 →  | |
| FILE-A3 | 07151302 | | |
| FILE-B1 | 05291300 | | |
| FILE-B2 | | 07061006 → | |
| FILE-B3 | | | 07052250 |
| FILE-C1 | | | 07140935 |
| FILE-C2 | | | 07151340 |
| FILE-D1 | | | 07151125 |

IMAGE PROCESSING APPARATUS HAVING GROUP STORAGE AREAS FOR STORING FILES FOR OPERATOR GROUPS

This application is based on application No. 2004-260898 filed in Japan, the contents of which are hereby incorporated by reference.

BACKGROUND OF THE INVENTION

The invention relates to an image processing apparatus having storage areas for storing files.

An image processing apparatus such as a multi-functional peripheral (MFP) or a file server is connected through a network to external devices such as personal computers (PC) and runs jobs registered from the external devices. The image processing apparatus has a hard disk drive which can store many documents and can be operated from the external devices. The storage area in the hard disk drive is divided into storage areas, and each of the storage areas is called a box. In an example described in Japanese Patent laid open Publication 2004-104411, a box is provided for each authenticated user. An external apparatus sends a job to the image processing apparatus, and the job is stored in the user's box as a job. The user can perform an operation or processing such as copy or print on the jobs (documents) registered in the box. Further, if a folder in a personal computer as an external apparatus is set to be shared with the image processing apparatus, the image processing apparatus can use the shared box as an external box.

When an operator of an image processing apparatus starts to process a file stored in a box, he or she looks at a list of the files in the box and selects a file to be processed. The file list may be displayed in the order of file name or creation date or for each file format.

However, when an operator designates a file to be printed in the files stored in a box, he or she does not always remember the name of the file. For example, when a file was prepared by a person belonging to his or her group, it may take a long time to find the file if the file name is not remembered definitely. When a person belonging to his or her group browsed or printed a file created by a person in a different group, it may take a long time to find the file, similarly to the above case, though the possibility that the operator uses the file is high.

SUMMARY OF THE INVENTION

An object of the invention is to make it easier for a user to find a file in the files stored in an image processing apparatus.

In one aspect of invention, in an image processing apparatus, a storage device is provided for a plurality of operators for storing files and storing run history on the files for each of the plurality of operators, wherein operators among the plurality of operators can be related. A display device displays information on the files and receives an instruction on the files by one of the operators, and a display controller makes the display device display information on files which were dealt with by a group including an operator and other operators related to the operator among the plurality of operators when the operator instructs to display the information on files. In a modified example, the display controller makes the display device display the information on files when the operator accesses said storage device.

An advantage of the present invention is that an operator of an image processing apparatus can find a file easily by displaying information on files with reference to run history among connected operators.

Another advantage of the present invention is that an operator of an image processing apparatus can find a necessary file easily by setting priority order in the files to be displayed.

BRIEF DESCRIPTION OF THE DRAWINGS

These and other objects and features of the present invention will become clear from the following description taken in conjunction with the preferred embodiments thereof with reference to the accompanying drawings, and in which:

FIG. 12 is a diagram of a result of search of print history.

DETAILED DESCRIPTION OF THE PREFERRED EMBODIMENTS

Figure 1:
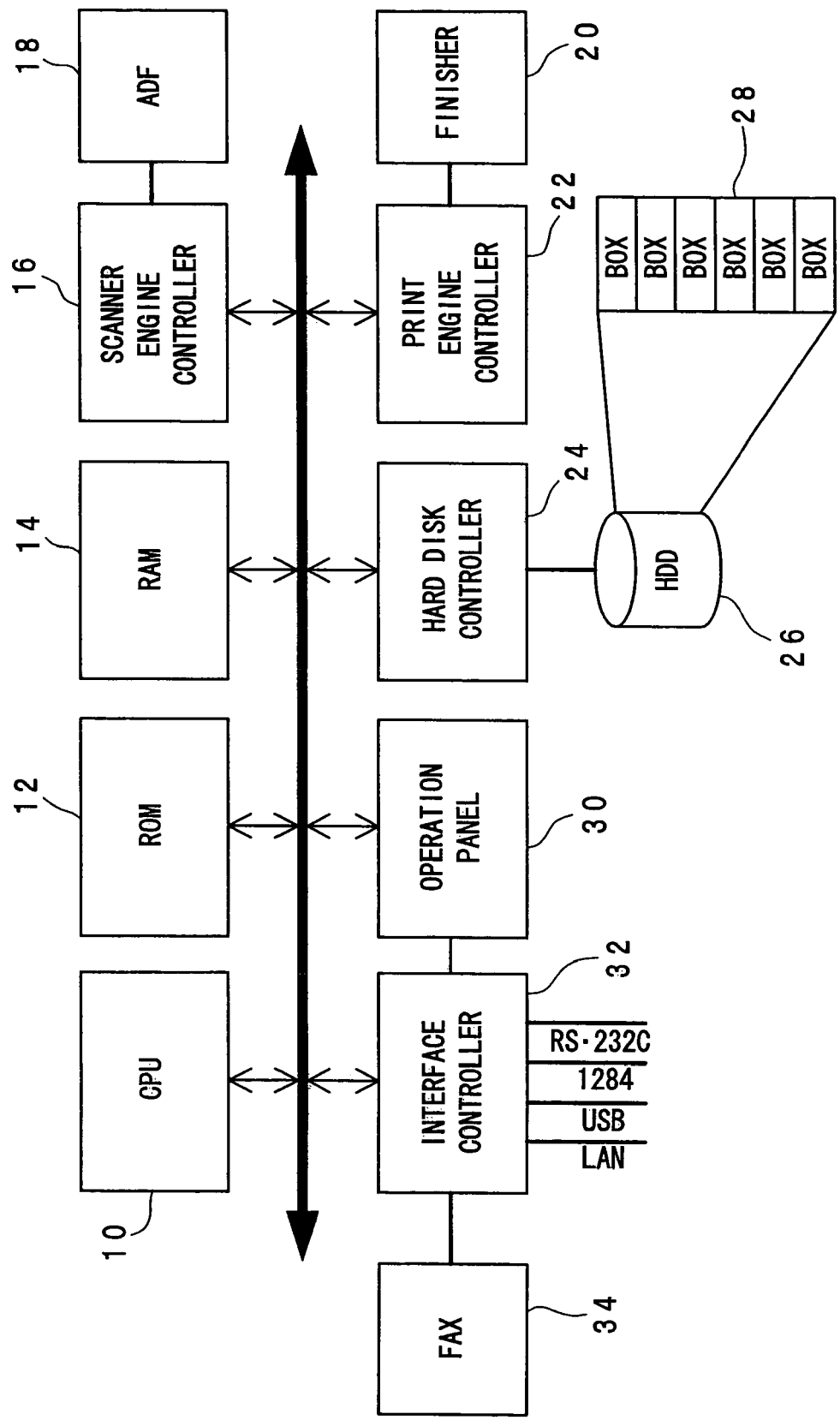
FIG. 1 is a control block diagram of a multi-functional peripheral and the computer.

Referring now to the drawings, wherein like reference characters designate like or corresponding parts throughout the several views, embodiments of the invention are explained below.

An image processing apparatus according to an embodiment of the invention is, for example, a multi-functional peripheral having functions of a printer, a scanner, a facsimile apparatus and the like. It can be connected through a network to an external apparatus such as a computer (PC) and runs a job registered by an external apparatus. The image processing apparatus has a hard disk drive as a storage device with a large capacity which can store many documents. Each storage area provided in the hard disk by dividing the large capacity into storage areas is called as box. Jobs (documents) sent from external apparatuses to the image processing apparatus can be stored in the boxes. Further, if a folder in an external apparatus such as a computer is set shared with the image processing apparatus, the shared folder can be registered as an external box in the image processing apparatus.

In the hard disk drive, operators have boxes therein. The boxes can be related in this embodiment. For example, a group box is provided for each group of operators, and boxes of the members in a group are provided in a group box for the group. Files of each operator in a group are registered in a box provided for the operator, and a user belonging to the group can share the files of the other members in the group. When an operator searches a file of other members in the group, he or she can refer to run history of the other members besides the user's run history. Then, a file shared in the group can be found easily. This is explained below in detail.

FIG. 1 shows a structure of a multi-functional peripheral (hereinafter referred to as MFP) as an example of an image processing apparatus according to a first embodiment of the invention. An MFP is a network device which can be operated as a scanner, a printer, a copying machine, a facsimile apparatus and the like. A central processing unit (CPU) 10 is provided to control the entire MFP. The CPU 10 is connected to components such as a read-only memory (ROM) 12 storing programs and data, a random access memory (RAM) 14 as a work area, a scanner engine and its controller 18 with an automatic document feeder 16, a print engine and its controller 22 with a finisher 20, a hard disk controller 24 for controlling a hard disk drive 26, an operation panel 30 for operation and display, a facsimile apparatus 34 and an interface controller 32 for communication of various signals with the external. When the MFP is operated as a scanner, the scanner engine reads an image under the control of its controller. File storage areas called boxes 28 are provided in the hard disk drive 24 used as a data storage apparatus, and each operator can use his or her own box exclusively. When a job is sent to the MFP by an operator at an external computer through a network, the job is stored as a document in a box 28 for the operator. When the MFP is operated as a printer, the image read by the scanner 18 is printed by the print engine 20. The operation panel 30 receives various instructions and data inputted by an operator and shows various display screens for displaying data and for receiving instructions.

Figure 2:
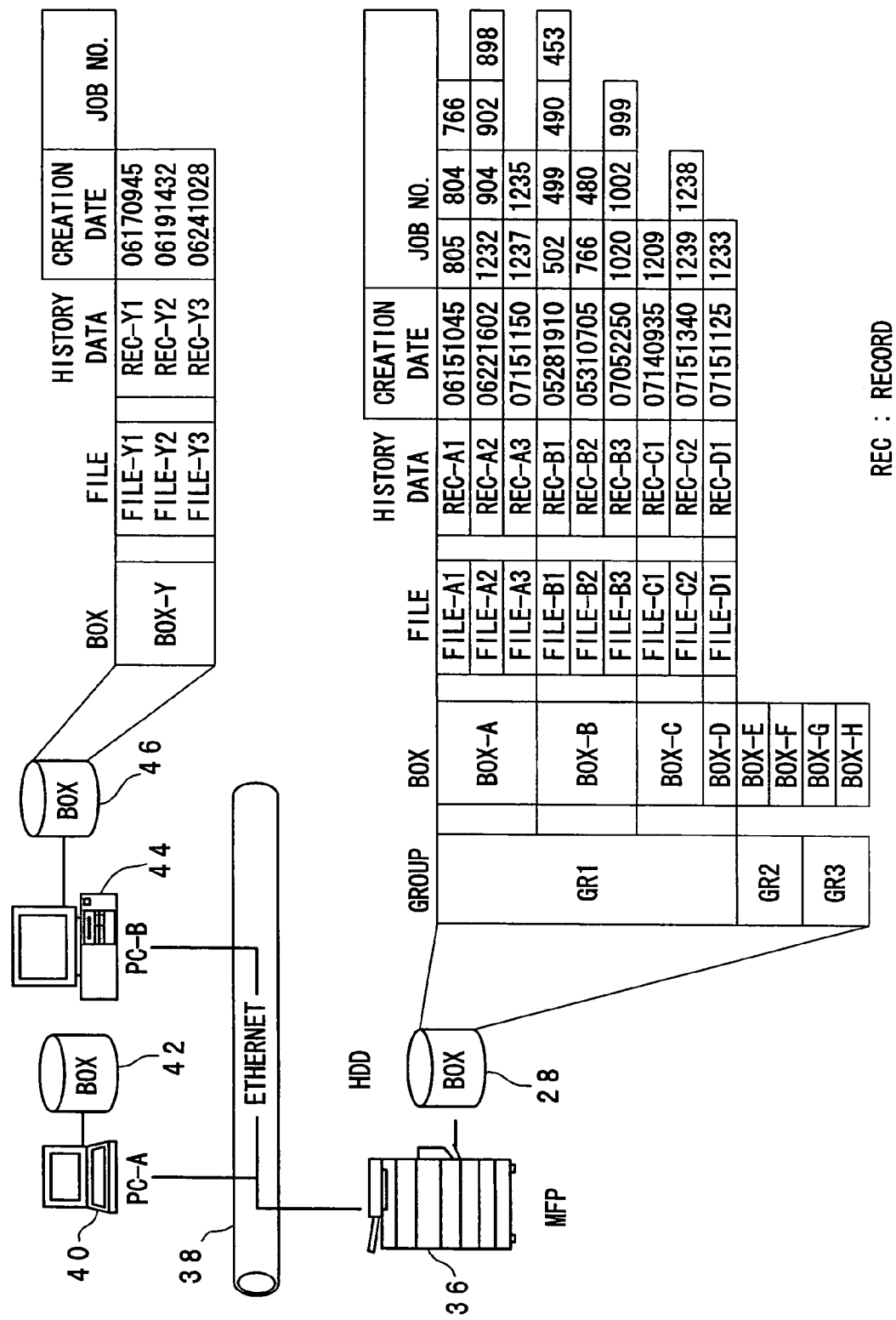
FIG. 2 is a diagram of a network system including a multi-functional peripheral and computers having boxes.

In the network shown in FIG. 2, an MFP 36 is connected to computers (PCs) 40, 44 via Ethernet (trademark) 38 or the like. The MFP 36 can be operated as a printer, a scanner, a copying machine or the like under the instruction from the computer 40, 44. When a folder created in the computer 40, 44 is registered as shared in the MFP 38, the shared folder can be dealt as an external box by an operator of the MFP 38. The boxes 28 in the hard disk drive 26 are connected through the interface controller 32 to a local area network, a telephone line and/or the like. Users of the computers 40, 44 can instruct an operation such as print of a job (document) registered in a box in the hard disk drive 28. On the other hand, a user of the MFP 36 can operate a file stored in the external boxes in hard disk drives 42, 46 in the computers 40, 44 through the interface controller 32.

As mentioned above, the boxes (storage areas) used exclusively by operators of the MFP 36 are divided for each group. In an example shown in FIG. 2, the boxes in the MFP 36 are divided into group boxes of three groups GR1, GR2 and GR3. Each user belonging to a group has a box in the group box for the group. For example, group GR1 has four boxes BOX-A, BOX-B, BOX-C and BOX-D. Image files and a history data file related to the image data are stored in a box. For example, in box BOX-A, three files FILE-A1, FILE-A2 and FILE-A3 are registered, and history data REC-A1, REC-A2 and REC-A3 are stored for the files.

The history data file includes creation date of a file (that is, a date when the file is sent from the scanner or received from an external device) and a job number or job numbers therefor. A job number is related to history data of the entire MFP. For example, three job numbers are recorded in the history data of file FILE-A1, and this means that the file was used three times. On the other hand, an external box in an external computer is divided for users of the computer, and they are not grouped. For each file in the box, its history is recorded. It is to be noted that the structures shown in FIGS. 1 and 2 are common to the other embodiments.

When a file is transferred and stored in one of the boxes, job history as well as job number are recorded in a history file for the entire MFP. Table 1 shown below represents a part extracted from the job history data in the history file. For each job, job number, operator name, job type, destination of data and run date are recorded. In Table 1, "<<" and ">>" represent a direction of data flow. (The run date is shown only on month, day, hour and minute.)

TABLE 1

| Job No. | Operator | Job | Destination | Run date |
|---|---|---|---|---|
| 1231 | GR2-E | copy | ... | 07151045 |
| 1232 | GR1-A | print | BOX-A>> | 07151057 |
| 1233 | GR1-D | scan | BOX-D<< | 07151125 |
| 1234 | GR2-H | copy | ... | 07151133 |
| 1235 | GR3-H | receive | PC-A>>BOX-A | 07151150 |
| 1236 | GR1-B | copy | ... | 07151157 |
| 1237 | GR1-B | print | BOX-A>> | 07151302 |
| 1238 | GR1-C | scan | BOX-C<< | 07151340 |
| 1239 | GR1-C | transfer | BOX-C>>PC-C | 07151344 |
| 1240 | GR1-C | print | PC-F>> | 07151354 |

Next, access to a file in a box is explained when data transferred is printed. It is assumed that operator B searches a file of a different operator in the same group GR-1 (for example file FILE-A1 of the operator A).

In the operation panel 28 of the MFP 36, the boxes are grouped. For example in the example shown in FIG. 2, operators A and B belong to the same group. Therefore, operator A is related to operator B by the grouping, and run history of operator A is connected to that of operator B by the grouping.

Now operator A transfers and stores file FILE-A1 from his or her computer (PC-A) 40 to box BOX-A. Then, the job number and the job history of the file are recorded in the history file for the entire MFP. That is, the job history number is recorded for run history REC-A of the operator A. It is to be noted that file FILE-A1 is not stored in box BOX-B of the operator B.

Next, operator B searches file FILE-A1 of another operator (in this case, operator A). Operator B selects print as an job of the MPF 36 and opens box BOX-B in order to select a file to be printed. At this time, the MFP 36 displays run history REC-A of operator A as well as reads and display the history data of all the other operators in the same group related to operator B. At this time, it is displayed in the history data that file FILE-A1 is printed by operator A. Thus, operator B can find file FILE-A1 easily by referring to the history of the group operator B belongs to and by referring to files described in the history. Alternatively, a file list is displayed instead of run history. When operator B prints file FILE-A1, the job number of the print job is added to run history REC-B of the operator B.

The amount of information displayed in the operation panel 30 is relatively small, and it may take a long time to find a file of interest in the run history or in the file list. Therefore, it is desirable to display necessary files preferentially in the run history or file list. Then, files which would be used are displayed preferentially.

In an example of priority order explained here, priority order of a file for printing is changed as shown below in Table 2 on a change in priority order. In Table 2, "last time A" means that current operator B performs an operation of a file after the previous operator A performs an operation of the file, that is, that the current operator B is different from the operator A in the history of the file. Further, "last time B" means that the same operator B performs an operation after a previous operation, that is, that the current operator B is the same as the operator B in the history of the file. When the previous operation is print, scan (copy) or receive and the current operation is print, the priority order is moved up. However, when the file is printed by the same operator, the priority order is moved down.

The priority order is changed in Table 2 as shown with arrows and as noted in the leftmost column as items A to D.
(A) The priority order is moved up for a file printed by a different operator because it is likely to be used again.

(B) The priority order is not changed for a file used for transmission.
(C) The priority order is moved up for a file obtained by scan by the scanner or received from an external device because it is likely to be used.
(D) The priority order is moved down for a file printed by the same operator because it is unlikely to be used again.

TABLE 2

| History | | Current Operator B | | |
|---------|-----------|-------|----------|------|
| Operator | Operation | Print | Transfer | Note |
| Last time A | Print | ↑ | → | (A) |
|  | Transmit | → | → | (B) Except a job received by B |
|  | Scan | ↑ | ↑ | (C) |
|  | Receive | ↑ | ↑ | (C) Except a job received by B |
| Last time B | Print | ↓ | → | (D) |
|  | Transmit | → | → | (B) |
|  | Scan | ↑ | ↑ | (C) |
|  | Receive | ↑ | ↑ | (C) |

Therefore, for example, when run history REC-A of operator A is compared with run history REC-B of operator B and it is decided that print of file FILE-A1 is not included in run history REC-B, the priority order of the file without run history is moved up and displayed preferentially. Next, if operator B opens BOX-B in order to print file FILE-A1 again, the priority order of file FILE-A1 is moved down because run history REC-B includes a history for the file FILE-A1.

Figure 3:
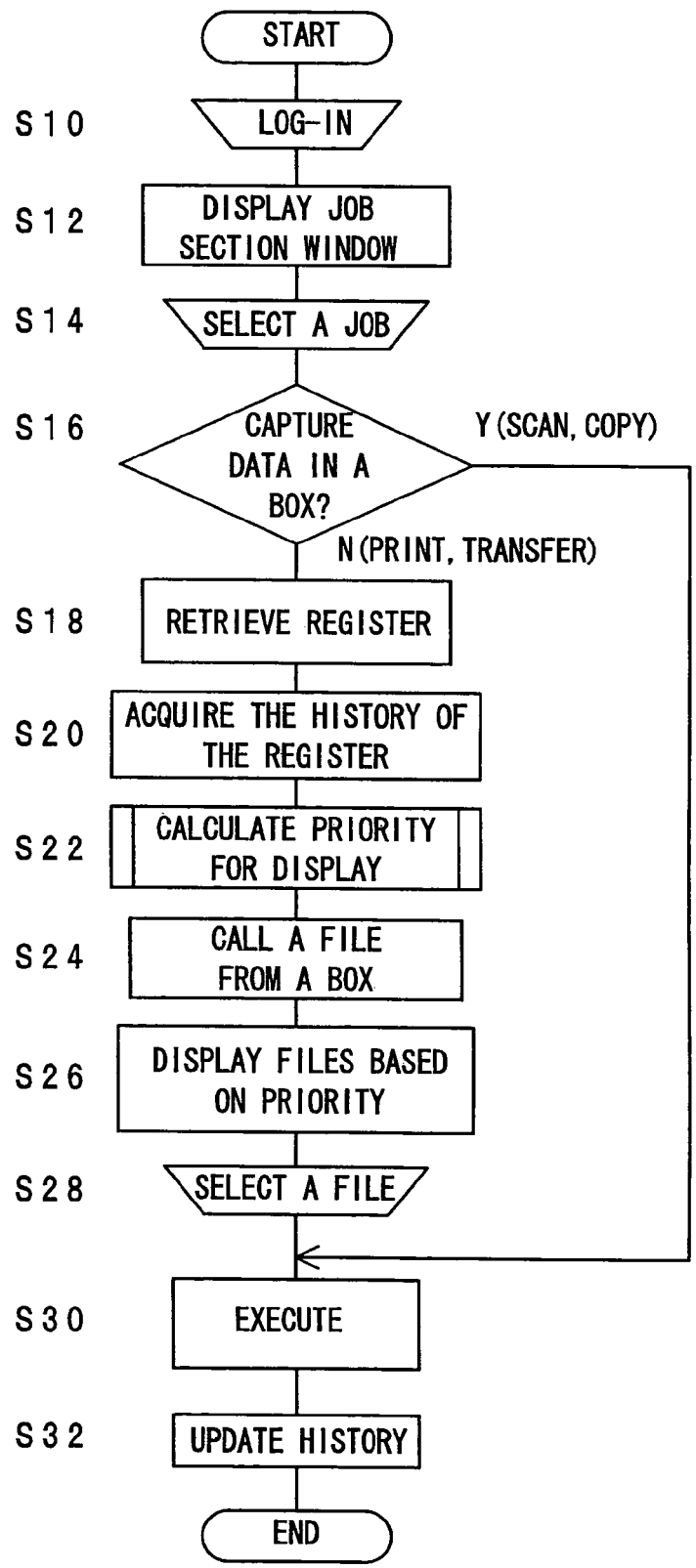
FIG. 3 is a flowchart of display control.
Figure 4:
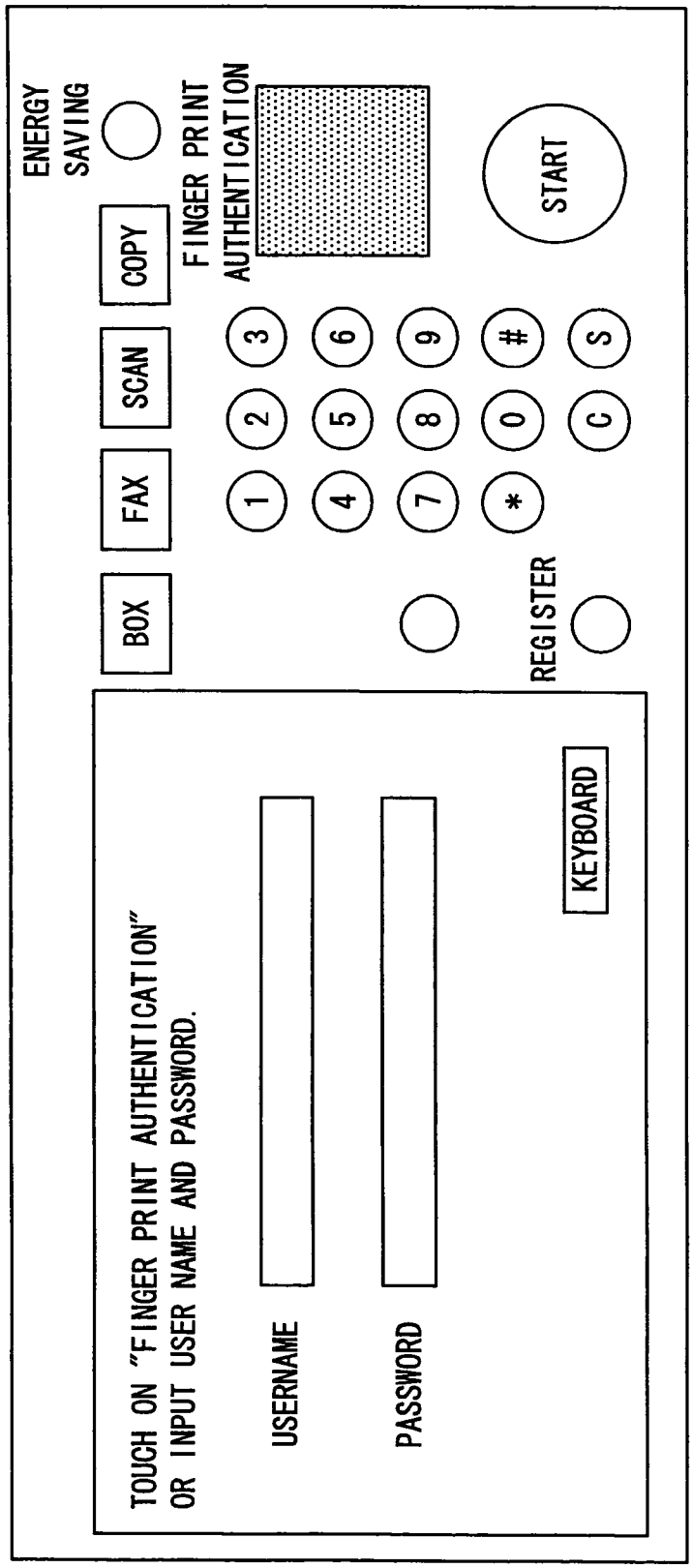
FIG. 4 is a diagram of a log-in screen.

FIG. 3 shows a flowchart of display control by the CPU 10. First, a log-in of an operator is accepted (S10). FIG. 4 shows a log-in screen displayed on the operation panel 30. In the left half, and a user name and a password can be inputted by an operator in the screen. Alternatively, a fingerprint may be inputted for fingerprint authentication by touching a section therefor, as shown in the right side of the screen. At the top of the right side of the screen, buttons of "BOX", "FAX", "SCAN" and "COPY" are provided, and an operator can set a type of operation (for example, box selection, fax transmission, image reading or copying). Below the buttons, ten-keys, a register key, a start key and the like are provided.

Figure 5:
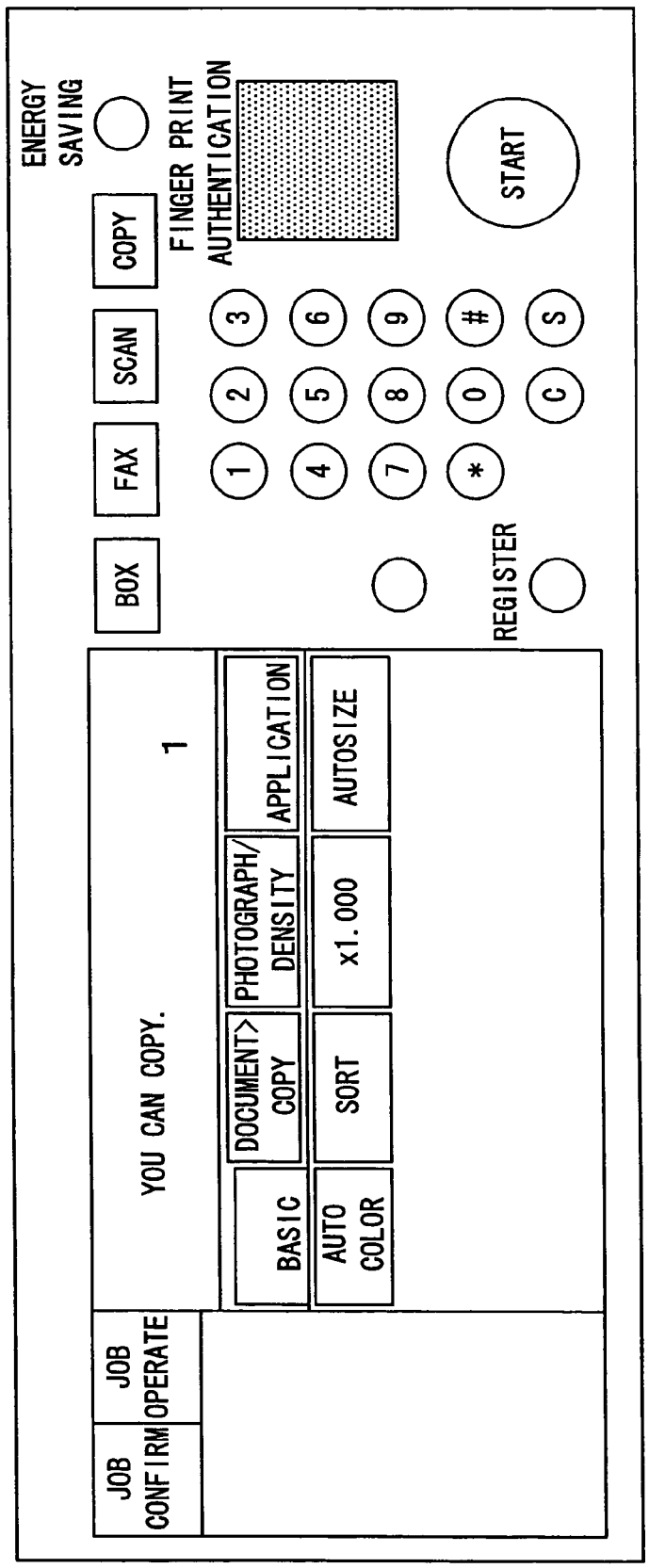
FIG. 5 is a diagram of a job selection screen.
Figure 6:
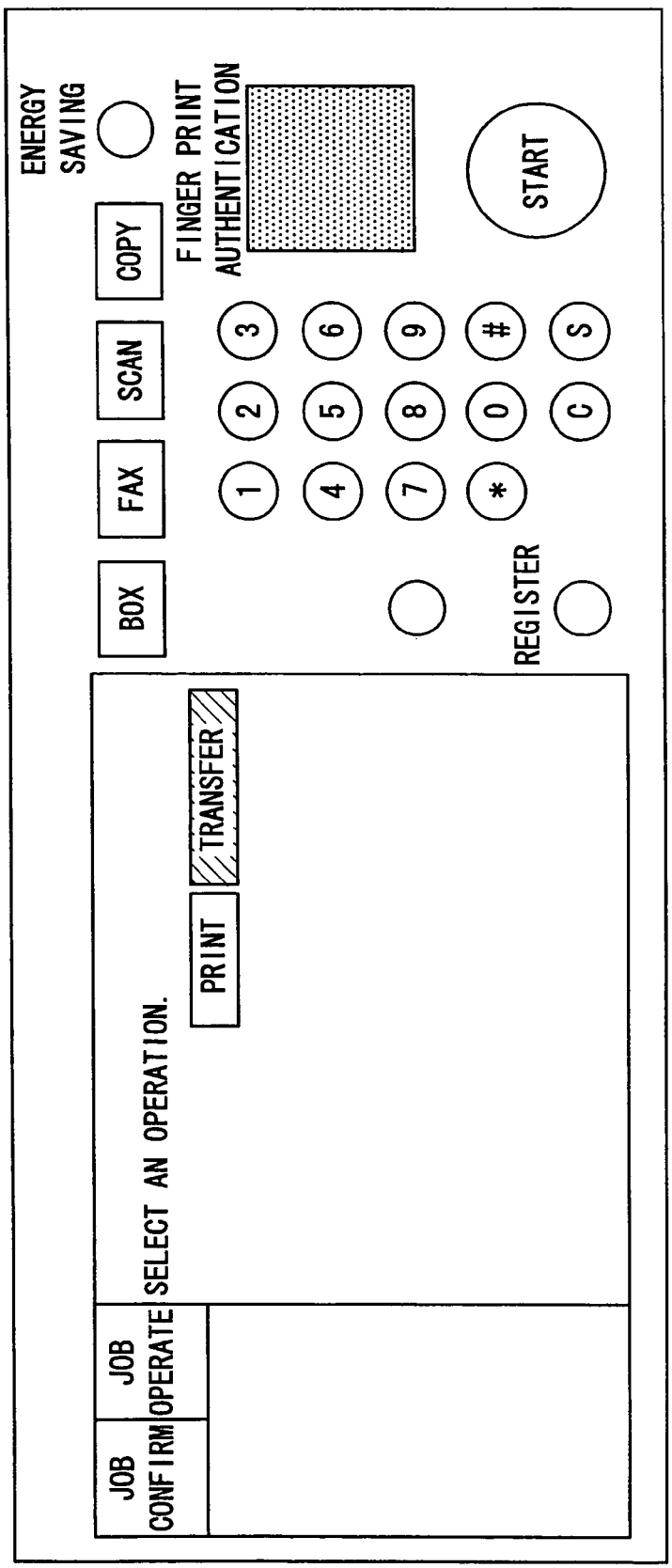
FIG. 6 is a diagram of a box operation selection screen.
Figure 7:
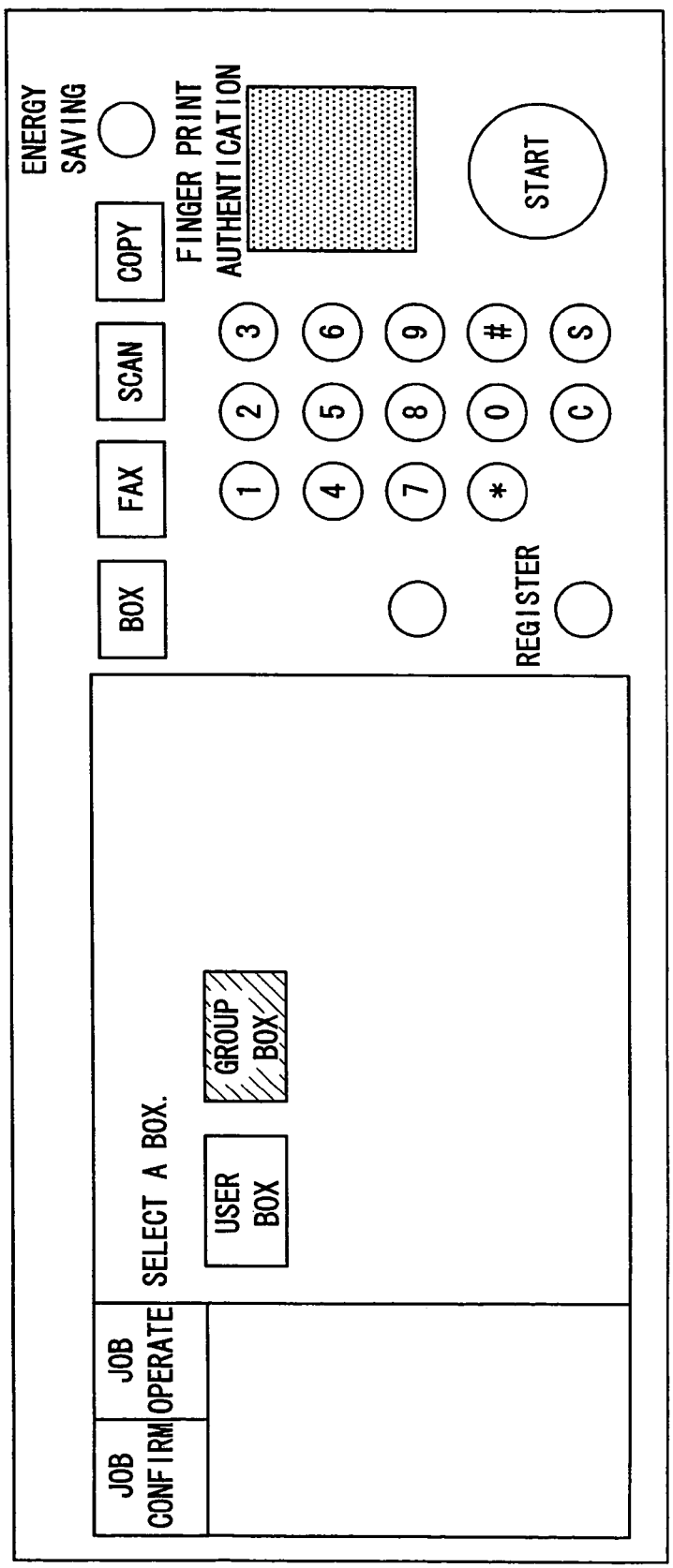
FIG. 7 is a diagram of a box display and selection screen.
Figure 8:
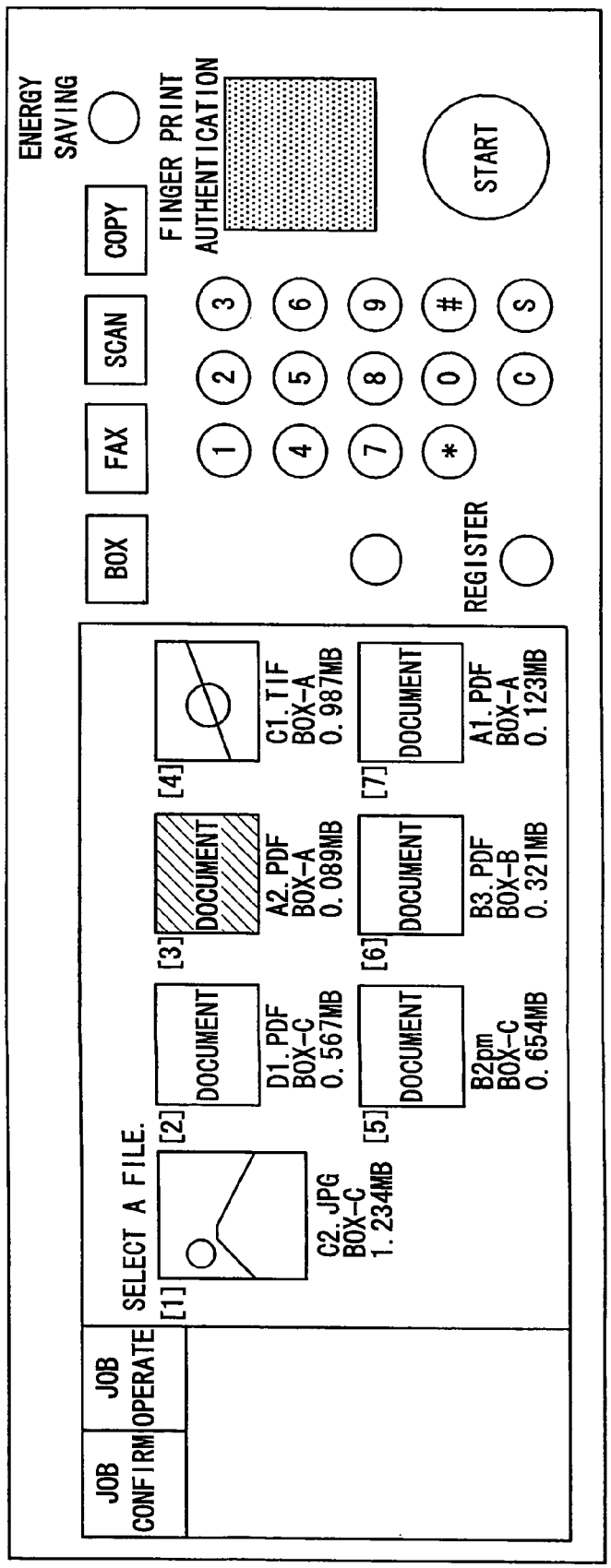
FIG. 8 is a diagram of a file display and selection screen.
Figure 9:
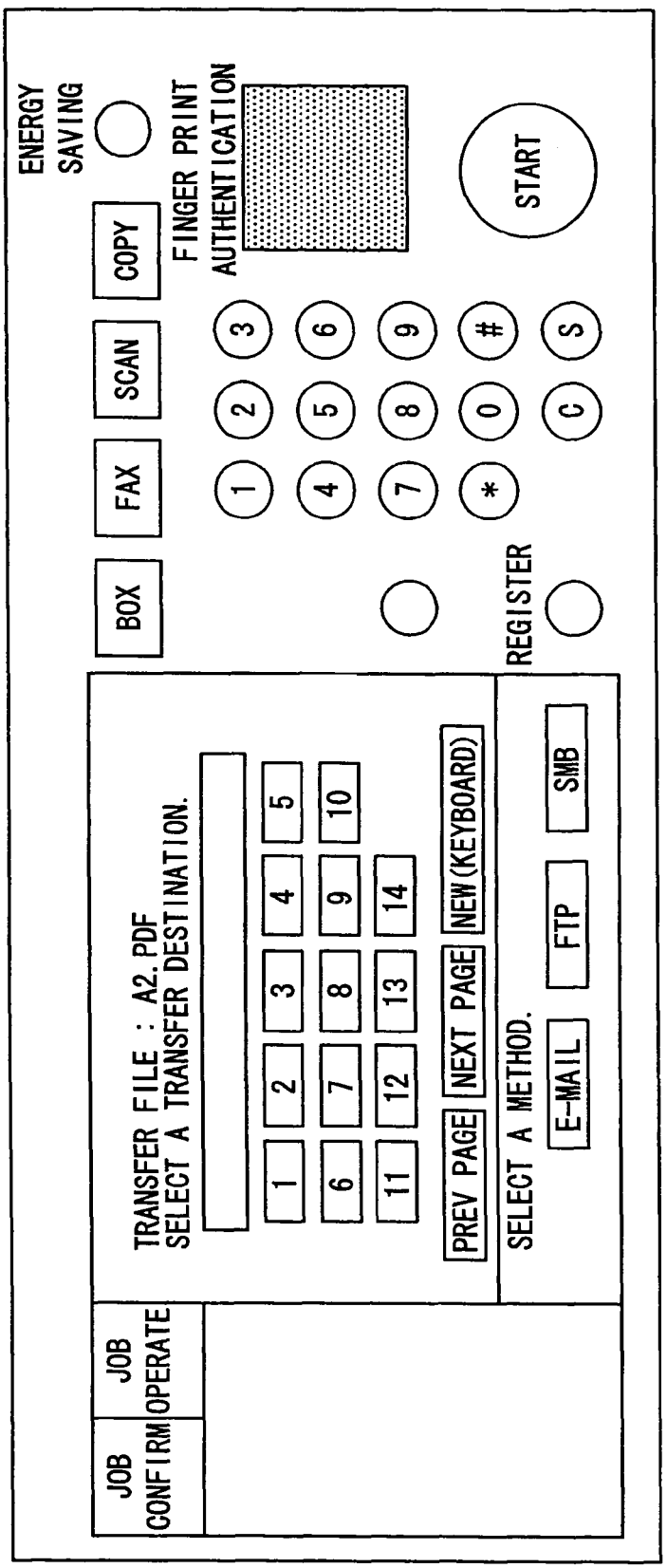
FIG. 9 is a diagram of a transfer screen.

After the log-in authentication, a screen for selecting a job to be run is displayed (S12). FIG. 5 shows the job selection screen. Copy (COPY) is set in default setting, and a display for setting a copy job is displayed in the left half of the screen. A job selection in the screen by the operator is accepted (S14). For example, if the operator selects "BOX", a box operation selection screen for selecting print or transfer is displayed as shown in FIG. 6 in the left half. When the operator selects "transfer", a box display and selection screen shown in FIG. 7 is displayed, wherein the operator can select a box type, user box or group box. If the operator selects group box, a list of files in the group box is displayed with thumb nails of the files, as shown in a file display and selection screen in FIG. 8 in the priority order based on the rules of Table 1. In the example, thumb nails of seven files are displayed each with a file name, a box name and memory capacity. When the operator selects a file among them, a transfer screen shown in FIG. 9 is displayed. Now, the operator selects an address and a transfer method for the file to be transferred. Then, the job selection is completed.

When a job is selected as mentioned above, it is decided next whether the job includes storage of data to a box (S16). If the job is not decided to include data storage, that is, if the job is print or transfer, the person or operator who registers the job is searched (S18), and a history of the person is obtained (S20). Next, the priority order for display is calculated (S22). Then, file history data is called from the box (S24), and a run history or a file list of the files in the box is displayed based on the priority order (S26). When the operator selects a file in the screen (S28), the flow proceeds to step S20. On the other hand, if the job is decided to include data storage to the box (YES at S16), the flow proceeds directly to step S30.

Next, the job is run (S30). Then, the job history is updated (S32).

Figure 10:
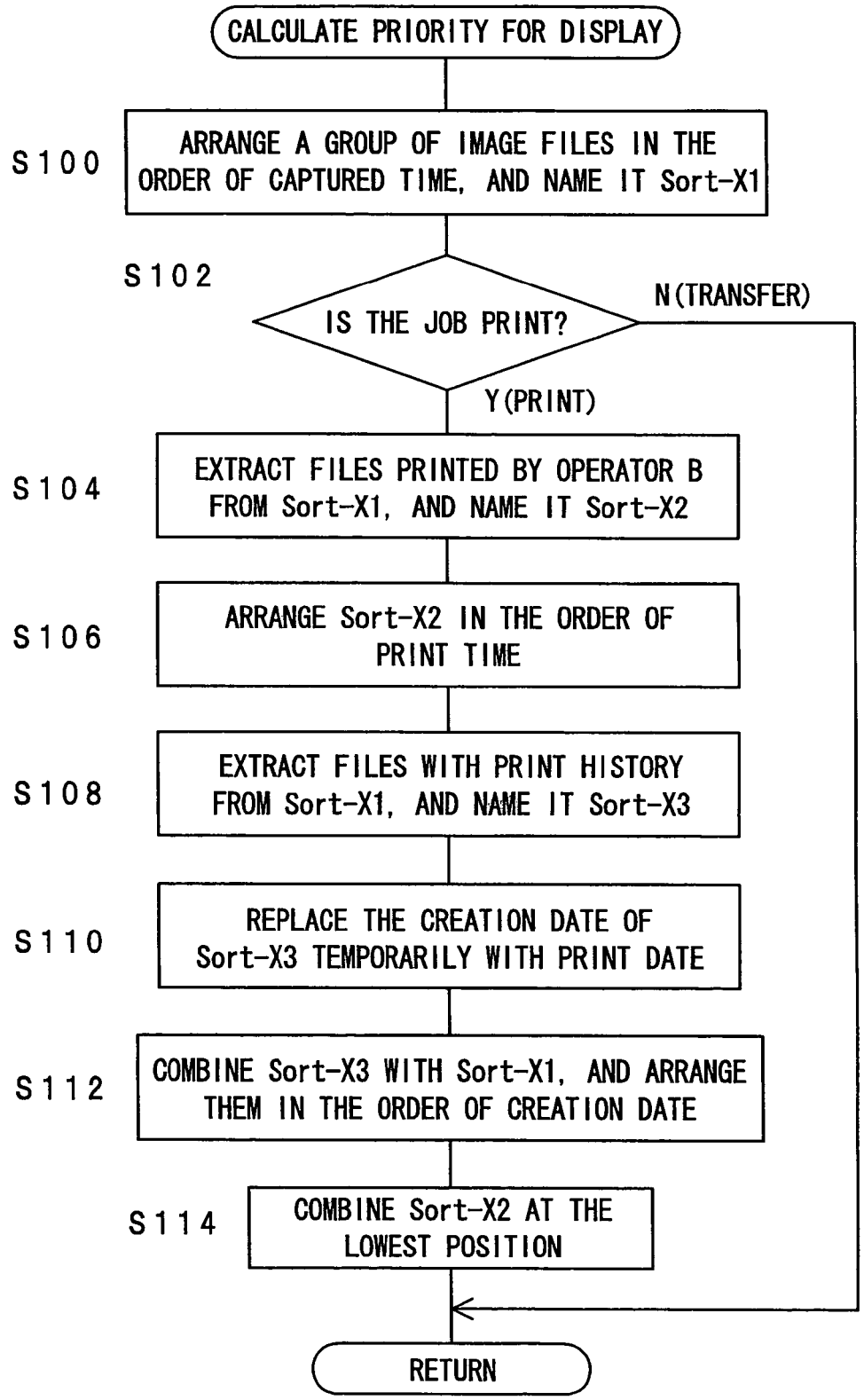
FIG. 10 is a flowchart of calculation of priority order.

FIG. 10 shows a flowchart of the calculation of the priority order (step S22 in FIG. 3). In this example, the priority order is changed for a print/transfer job.

Figure 11:
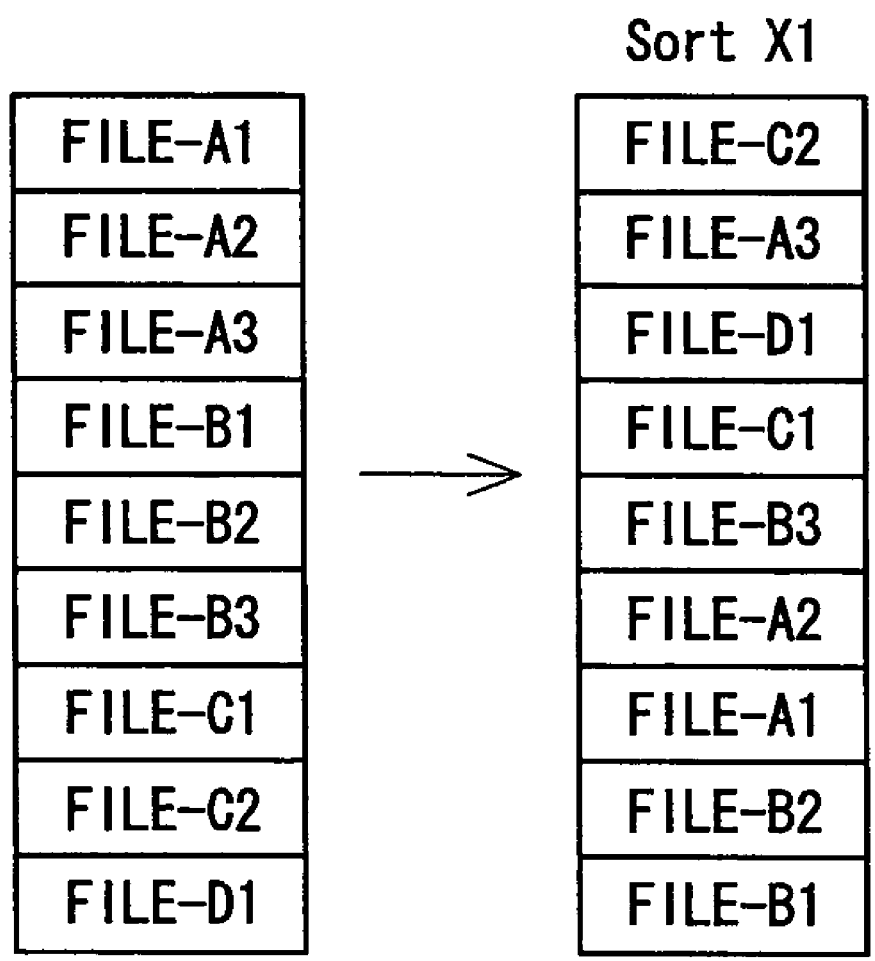
FIG. 11 is a diagram of a processing of run history data.

First, the run history data for the group is sorted by a time at which an image file is stored and displayed in descending order. The sorted data is named Sort_X1 (S100). In an example of run history data shown in FIG. 11, the image files in group GR1 in FIG. 2 is rearranged in order of creation date. Thus, files obtained by image reading or data receive are displayed preferentially. In FIG. 11, it is to be noted that a file name represents run history data of a file having the file name.

Next, it is decided whether the current job is print or not (S102). If it is decided that the current job is not print, the flow returns readily to the main flow.

Figure 13:
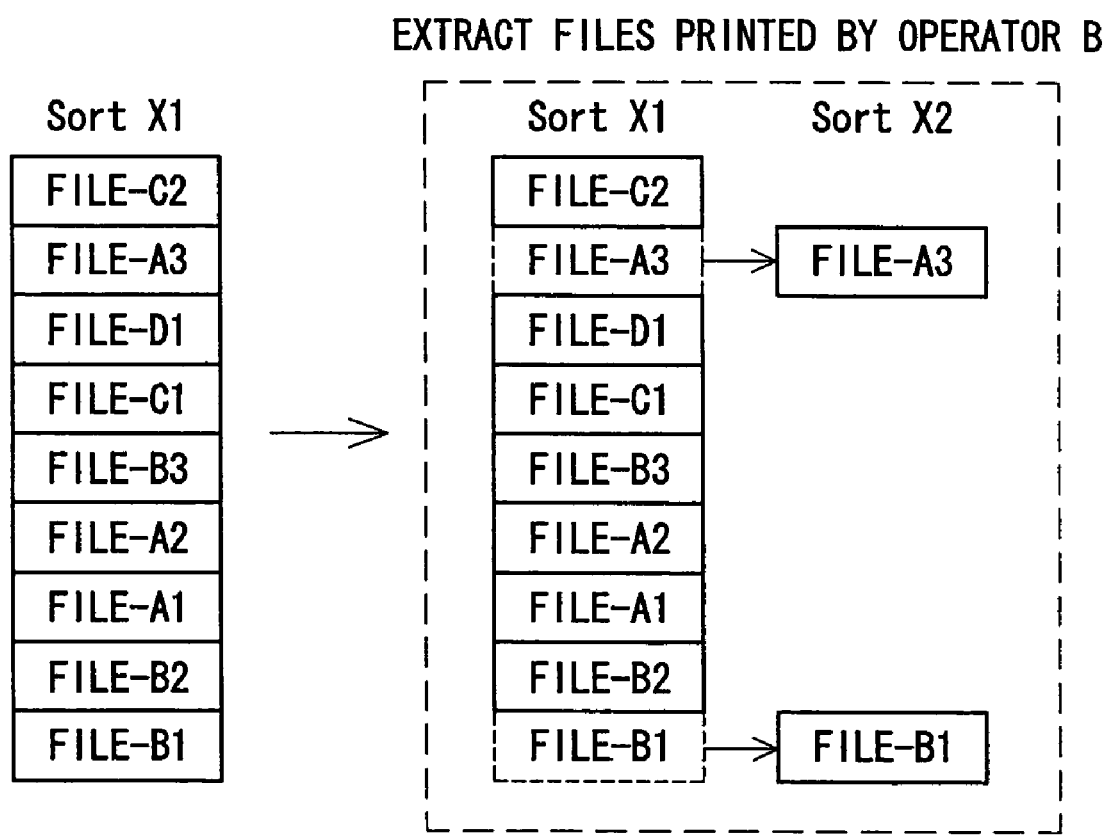
FIG. 13 is a diagram of a processing of run history data.

On the other hand, if it is decided that the current job is print, the priority order is changed with reference to print, as will be explained below. First, files printed by operator B are extracted from the sorted data Sort_X1, and it is called Sort_X2 (S104). In an example shown in FIG. 12, from the job history data of the entire apparatus shown in FIG. 2, files with print job history related to group GR1 are extracted. Next, as shown in FIG. 13, print history of operator B is extracted from Sort_X1 wherein the files are arranged in order of creation date, and it is named Sort_X2. Then, the sorted data Sort_X2 is arranged in descending order of print date (S106).

Figure 14:
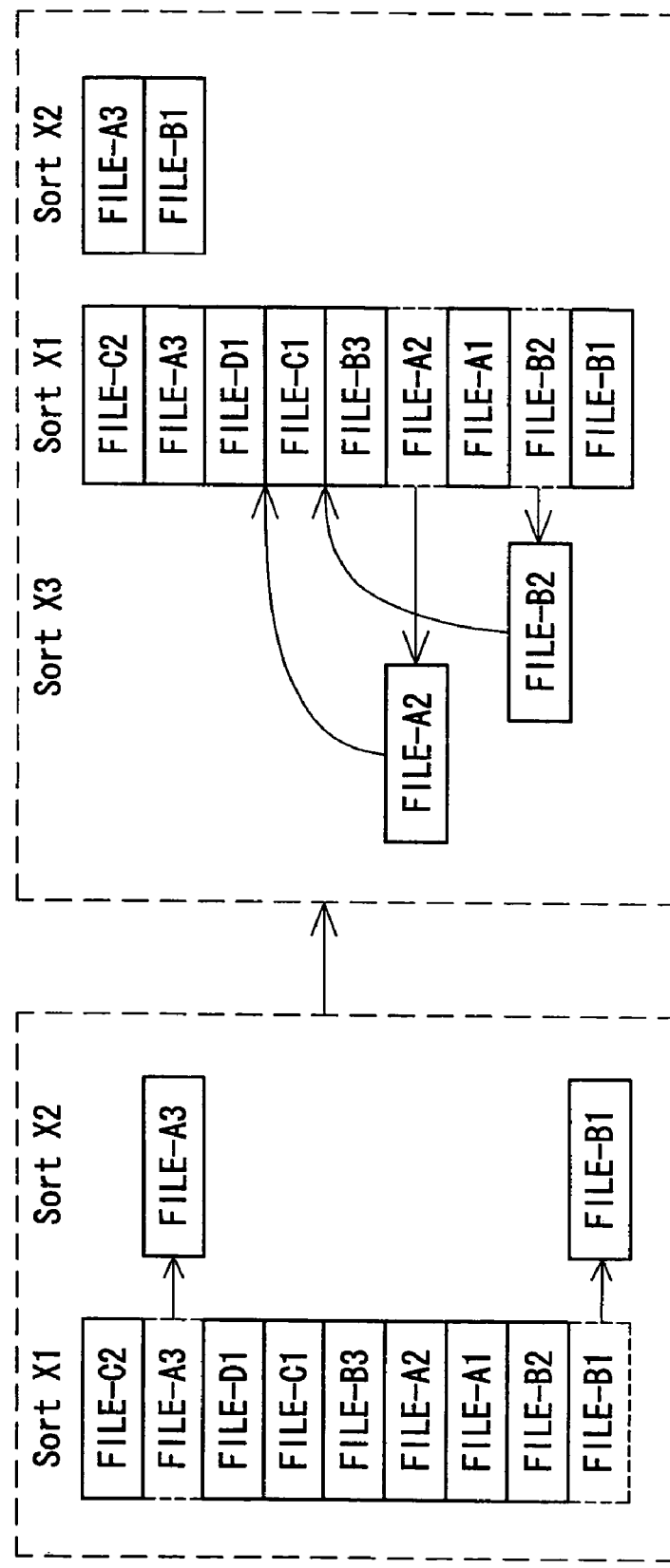
FIG. 14 is a diagram of a processing of run history data.
Figure 15:
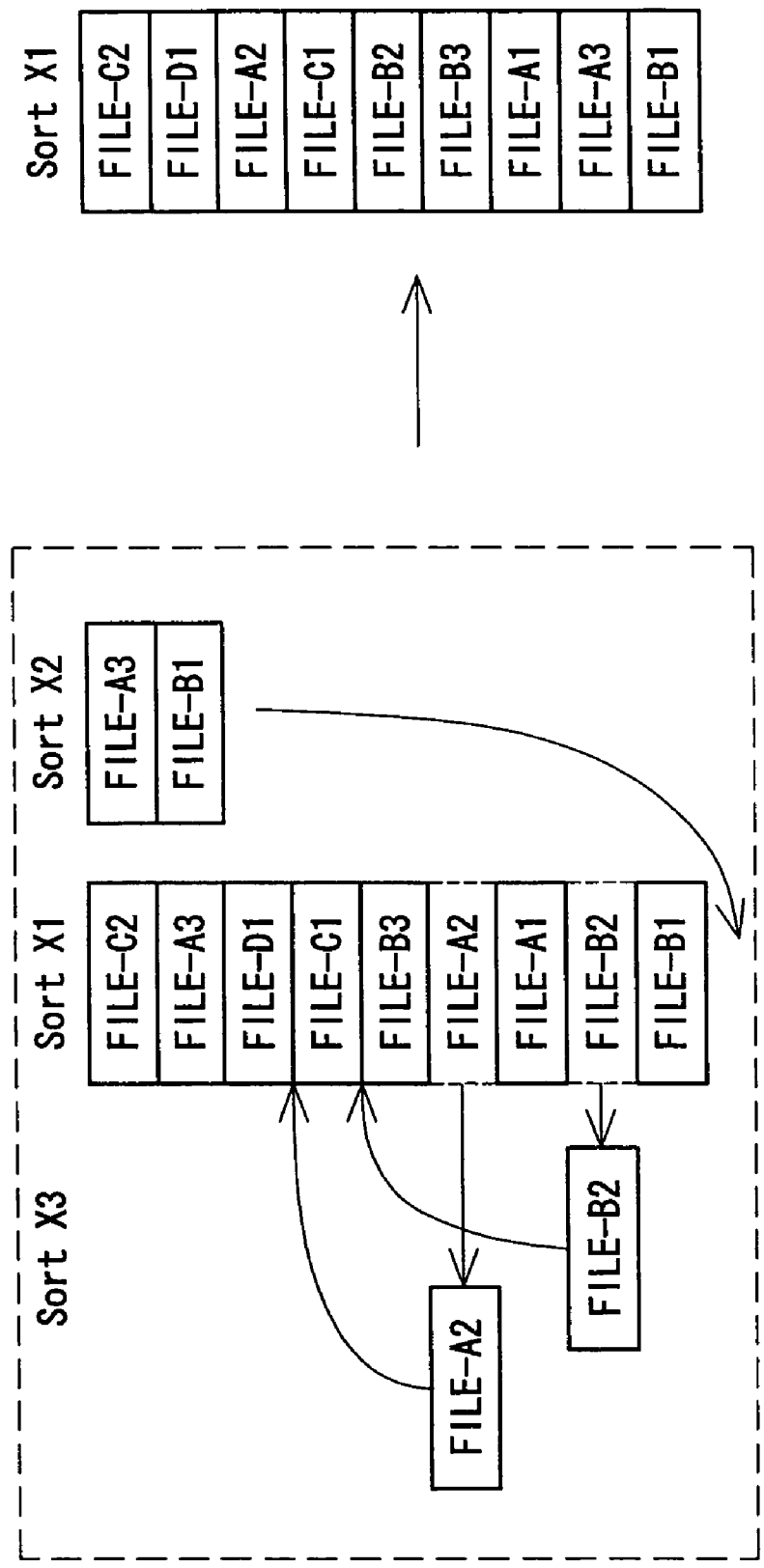
FIG. 15 is a diagram of a processing of run history data.

Next, files with print history are extracted from Sort_X1 (S108), and it is called Sort_X3. Then, the created dates of the extracted files, such as files FILE_A2 and FILE_B2 in an example shown in FIG. 14, are replaced temporarily with print dates (S110). Next, Sort_X3 is combined with Sort_X1, and the files are rearranged in order of the temporary creation date (S112), and Sort_X2 is added to the last (S114). In an example shown in FIG. 15, print history of operator B is put at the last, and the rearrangement is completed. At step S26 in FIG. 3, the run history rearranged in the priority order as explained above is displayed in the screen of the operation panel 28. Then, after the job is completed, the history of the operator is updated on all the processing.

In the above-mentioned priority processing, files printed recently are displayed preferentially. Alternatively, files transferred or edited recently are displayed preferentially. In the case of edition, creation/correction date is used instead of print date.

In the above-mentioned embodiment, group boxes are provided for relating operators in a group to each other. Alternatively, a relational register area is provided in the hard disk drive 24, instead of the group boxes, so that an operator is registered to be related to a different operator or operators. For example, when the relational register area is set as shown below in Table 3, operators are related, similarly to the above-mentioned example of group box.

TABLE 3

| Relation number | Operator |
| --- | --- |
| 1 | A, B, C, D |
| 2 | E, F |
| 3 | G, H |

Alternatively, in the setting of file sharing for boxes (folders) of the operators, a related operator or operators are set as a sharer or sharers. When an operator searches a file in order to run a job therefor, files described in the run history of the other operators related to the operator are displayed, for example, at step S18 in FIG. 3 or the like. For example, when operator B selects print and opens a box BOX-B, file FILE-A1 is read and displayed from the box BOX-A of operator A from the run history REC-A of operator A related to operator B. Therefore, operator B can find file FILE-A1 easily by referring to files executed by related operators.

In an image processing apparatus (MFP) according to a second embodiment, when an operator operates the data storage device, information on files executed by the other operators related to the operator is displayed in the operation panel. It is necessary to make it easier to search a file executed by other operators because when the operator wants to print a file prepared by a person belonging to his or her group, if the file name is not remembered definitely, it may take a long time to find the file to be selected. The display of the above-mentioned information helps the operator to find a file easily.

Therefore, in the flowchart of display control in FIG. 3, when run history data to be displayed is created, run history of the other operators related to the operator is referred to. The other processing is similar to that of the first embodiment, and its explanation is omitted here.

In an image processing apparatus according to a third embodiment, a different operator prints data printed as a job from an external computer. As shown in FIG. 2, the MFP 36 is connected through the network to the computers 40 and 44. The MFP 36 has a web server for accessing boxes, and an operator of the computer 40, 44 can operate a file in the box. Further, a shared storage area (external box) 42, 46 in the computer 40, 44 can be accessed, and run history is also stored in the external box 42, 46 beside files. The display control program performs display by referring to run history both in the internal boxes and in the external boxes.

When operator B prints image data Y1 from the computer (PC-B) 44, the job number thereof is recorded in the run history REC-Y1 of operator B. File FILE-Y1 is not present in box BOX-A in operator A.

Next, when operator A selects print and opens box BOX-A, the MFP compares run history REC-A of operator A with run history REC-B of operator B, and find that the run history REC-B does not include print history for file FILE-Y1. The operator A is related to operator B. Then, the MFP 36 calls and displays file Y1 from the external box 46 of the computer (PC-B) 44 of operator B of the data source. When the operator A prints file FILE-Y1, the job number thereof is described in the run history REC-A of operator A.

In an image processing apparatus according to a fourth embodiment, an operator is allowed to change run history data. For example, when a group to which operator A belongs to is changed, operator A opens and changes a run history file with the operation panel 30 or the computer 40, 44, so as to limit the operation by the other operators. Then operator B outside the group cannot operate the files stored in box BOX-A. Thus, access to data which should not be shared within the group is forbidden.

Further, in the embodiment wherein a relation of operators is registered, when the registering of the relation is changed in a relation register area in the hard disk drive 26, persons who share files can be changed. For example, when a relation between operators A and B is canceled, operator B cannot access files of operator A.

In the example shown in FIG. 2, files of an operator can be browsed surely by another operator who belongs to the group. Alternatively, the operator can set an object individually, the run history of which is allowed to be accessed. For example, a password is requested to access a file in a box, so as to prevent an undesirable access.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:
    a storage device comprising a plurality of exclusive storage areas for storing files, each of the plurality of exclusive storage areas being provided for one of a plurality of operators, wherein a run history of a file is stored in the same exclusive storage area with the file, and wherein operators in a same group among the plurality of operators are registered as being related to each other;
    a display device which displays information for identifying the stored files, comprising an operation device for receiving an instruction on the stored files by one of the plurality of operators;
    a display controller, wherein when the one of the plurality of operators instructs the display device to display the information, the display controller makes the display device display the information on the stored files in the exclusive storage areas provided for the one of the plurality of operators and the operators registered as being related to the one of the plurality of operators; and
    a priority setter which sets a priority order on the stored files displayed by the display device, wherein the priority setter moves up the priority order for display of the file which was last operated by a first operator who is different from a second operator who is currently operating the image processing apparatus, and moves down the priority order for display of the file which was last operated by the second operator who is currently operating the image processing apparatus, so as to display preferentially the file operated by the first operator.

2. The image processing apparatus according to claim 1, wherein the storage device further comprising a group storage area for storing the files for a group of operators registered to each other, the group storage area including the exclusive storage areas of the operators in the group, whereby the operators in the group are related to each other.

3. The image processing apparatus according to claim 1, wherein the storage device further has an area for registering the operators as being related to each other.

4. The image processing apparatus according to claim 1, wherein the information for discriminating the stored files is the run history thereof.

5. The image processing apparatus according to claim 1, wherein the information for discriminating the stored files is a list of files having run histories.

6. The image processing apparatus according to claim 1, wherein the priority setter compares the run histories by the operators registered as being related to each other and discriminates that an operator who currently operates the file is different from an operator who operated the file last time.

7. The image processing apparatus according to claim 6, wherein the priority setter moves up the priority order for display of the file with a print history which was last printed by the first operator who is different from the second operator who is currently operating the image processing apparatus.

8. The image processing apparatus according to claim 6, wherein the priority setter moves down the priority order for display of the file which a print history which was last printed by a same operator as the operator who is currently operating the image processing apparatus.

9. The image processing apparatus according to claim 1, further comprising a communication device for connecting through a network to an external device; and
a server apparatus which operates via the communication device on the file stored in the exclusive storage area according to an instruction from the external device.

10. The image processing apparatus according to claim 1, further comprising a communication device for connecting through a network to an external device comprising an exclusive storage area in the external device, the exclusive storage area being shared with the exclusive storage areas in the storage device in the image processing apparatus, wherein the display controller changes the priority order in the displayed information in the display device with reference both to an operation history on the stored files in the exclusive storage areas in the image processing apparatus and an operation history on files in the shared exclusive storage area in the external device.

11. An image processing apparatus comprising:
a storage device comprising a plurality of exclusive storage areas for storing files, each of the exclusive storage areas being provided for one of a plurality of operators, wherein a run history of a file is stored in the same exclusive storage area with the file, and wherein operators in a same group among the plurality of operators are registered as being related to each other;
a display device which displays information for identifying the stored files, comprising an operation device for receiving an instruction on the stored files by one of the plurality of operators;
a display controller which makes the display device display the information on the stored files operated by operators registered or related to the one of the plurality of operators when an operation on the file by the operators are accepted; and
a priority setter which moves up a priority order for display of the file which was last operated by a first operator who is different from a second operator who is currently operating the image processing apparatus, and moves down the priority order for display of the file which was last operated by the second operator who is currently operating the image processing apparatus so as to display preferentially the file operated by the first operator, in the information displayed by the display device.

12. The image processing apparatus according to claim 11, wherein the storage device further comprising a group storage area for storing the files for a group of operators registered to each other, the group storage area including the exclusive storage areas of the operators in the group, whereby the operators in the group are related to each other.

13. The image processing apparatus according to claim 11, wherein the storage device further has an area for registering the operators as being related to each other.

14. The image processing apparatus according to claim 11, wherein the information for discriminating the stored files is the run history thereof.

15. The image processing apparatus according to claim 11, wherein the information for discriminating the stored files is a list of files having run histories.

16. The image processing apparatus according to claim 11, wherein the priority setter compares the run histories by the operators registered as being related to each other and discriminates that an operator who currently operates the file is different from an operator who operated the file last time.

17. The image processing apparatus according to claim 16, wherein the priority setter moves up the priority order for display of the file with a print history which was last printed by the first operator who is different from the second operator who is currently operating the image processing apparatus.

18. The image processing apparatus according to claim 16, wherein the priority setter moves down the priority order for display of the file which a print history which was last printed by a same operator as the operator who is currently operating the image processing apparatus.

19. The image processing apparatus according to claim 11, further comprising a communication device for connecting through a network to an external device; and
a server apparatus which operates via the communication device on the file stored in the exclusive storage area according to an instruction from the external device.

20. The image processing apparatus according to claim 11, further comprising a communication device for connecting through a network to an external device comprising an exclusive storage area in the external device, the exclusive storage area being shared with the exclusive storage areas in the storage device in the image processing apparatus, wherein the display controller changes the priority order in the displayed information in the display device with reference both to an operation history on the stored files in the exclusive storage areas in the image processing apparatus and an operation history on files in the shared exclusive storage area in the external device.

21. A display control method for an image processing apparatus having a storage device provided for a plurality of operators for storing files and storing run histories on the files for each of the plurality of operators, the display control method comprising the steps of:
registering the plurality of operators into a plurality of groups; and
when an operator from the plurality of operators instructs display of information, on a display device, displaying the information on the stored files in an exclusive storage area of the image processing apparatus provided for the operator and in exclusive storage areas of the image processing apparatus provided for operators registered in a same group of the plurality of groups with the operator,
wherein a priority of the stored files is set by a priority setter which moves up a priority order for display of a file which was last operated by a first operator who is different from a second operator who is currently operating the image processing apparatus, and moves down the priority order for display of the file which was last operated by the second operator who is currently operating the image processing apparatus, so as to display preferentially the file operated by the first operator.

22. A tangible computer readable medium storing a computer-executable display control program for an image processing apparatus having a storage device provided for a plurality of operators for storing files and storing run histories on the files for each of the plurality of operators, the stored computer-executable display control program comprising the steps of:

registering a plurality of operators into a plurality of groups; and when an operator from the plurality of operators instructs display of information, on a display device, displaying the information on the stored files in an exclusive storage area of the image processing apparatus provided for the operator and in exclusive storage areas of the image processing apparatus provided for operators registered in a same group of the plurality of groups with the operator, wherein a priority of the stored files is set by a priority setter which moves up a priority order of a file if the file is currently operated by an operator that is different from an operator who operated on the file the last time, and moves down the priority order for display of the file which was last operated by the operator who is currently operating the image processing apparatus.

23. A display control method for an image processing apparatus having a storage device provided for a plurality of operators for storing files and storing run histories on the files for each of the plurality of operators, the display control method comprising the steps of:

registering the plurality of operators into a plurality of groups; and when an operation on a file by an operator from the plurality of operators is accepted, on a display device, displaying information on the stored files in an exclusive storage area of the image processing apparatus provided for the operator and in exclusive storage areas of the image processing apparatus provided for operators registered in a same group of the plurality of groups with the operator, wherein a priority of the stored files is set by a priority setter which moves up a priority order of a file if the file is currently operated by an operator that is different from an operator who operated on the file the last time, and moves down the priority order for display of the file which was last operated by the operator who is currently operating the image processing apparatus.

24. A tangible computer readable medium storing a computer-executable display control program for an image processing apparatus having a storage device provided for a plurality of operators for storing files and storing run histories on the files for each of the plurality of operators, the stored computer-executable display control program comprising the steps of:

registering a plurality of operators into a plurality of groups; and when an operation on a file by an operator from the plurality of operators is accepted, on a display device, displaying information on the stored files in an exclusive storage area of the image processing apparatus provided for the operator and in exclusive storage areas of the image processing apparatus provided for operators registered in a same group of the plurality of groups with the operator, wherein a priority of the stored files is set by a priority setter which moves up a priority order for display of a file if the file which was last operated by a first operator who is different from a second operator who is currently operating the image processing apparatus, and moves down the priority order for display of the file which was last operated by the second operator who is currently operating the image processing apparatus, so as to display preferentially the file operated by the first operator.

* * * * *

UNITED STATES PATENT AND TRADEMARK OFFICE
CERTIFICATE OF CORRECTION

| | | |
|---|---|---|
| PATENT NO. | : 8,326,844 B2 | Page 1 of 1 |
| APPLICATION NO. | : 11/011096 | |
| DATED | : December 4, 2012 | |
| INVENTOR(S) | : Yamada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1260 days.

Signed and Sealed this
Eighteenth Day of November, 2014

Michelle K. Lee
*Deputy Director of the United States Patent and Trademark Office*